(12) United States Patent
Hammoud et al.

(10) Patent No.: US 12,403,752 B2
(45) Date of Patent: Sep. 2, 2025

(54) FOLDING TONNEAU COVER

(71) Applicant: Rivian IP Holdings, LLC, Plymouth, MI (US)

(72) Inventors: Mohamad Jeffrey Hammoud, Bloomfield Hills, MI (US); Philipp Josef Wolf, Dana Point, CA (US); James John Alexander Dowle, Laguna Beach, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 236 days.

(21) Appl. No.: 18/084,310

(22) Filed: Dec. 19, 2022

(65) Prior Publication Data
US 2024/0198771 A1 Jun. 20, 2024

(51) Int. Cl.
*B60J 7/14* (2006.01)

(52) U.S. Cl.
CPC ..................... *B60J 7/141* (2013.01)

(58) Field of Classification Search
CPC ....... B60J 7/14; B60J 7/141; B60J 7/16; B60J 7/1607; B60P 7/02
USPC ............. 296/100.01, 100.03, 100.06, 100.09
See application file for complete search history.

(56) References Cited

U.S. PATENT DOCUMENTS

| | | | |
|---|---|---|---|
| 9,004,571 B1* | 4/2015 | Bernardo | B60J 7/141 |
| | | | 296/100.09 |
| 9,266,416 B1* | 2/2016 | Nania | B60J 7/198 |
| 9,597,995 B1* | 3/2017 | Weltikol | B60J 7/141 |
| 10,406,896 B2* | 9/2019 | Ford | B60J 7/041 |
| 10,525,804 B2* | 1/2020 | Pompili | B60J 7/198 |
| 10,654,346 B2* | 5/2020 | Copp | B60J 7/041 |
| 11,697,332 B2* | 7/2023 | Bernardo | B60J 7/1607 |
| | | | 296/100.09 |
| 2014/0312646 A1* | 10/2014 | Copp | B60J 10/246 |
| | | | 296/100.12 |
| 2016/0031302 A1* | 2/2016 | Nania | B60J 7/198 |
| | | | 296/100.09 |

* cited by examiner

*Primary Examiner* — Jason S Daniels
(74) *Attorney, Agent, or Firm* — Haley Guiliano LLP

(57) ABSTRACT

Particular embodiments may provide a cover for a vehicle. The cover includes, in some embodiments, rectangular panels, each panel having a long edge, a short edge, and a guide. In some embodiments, the rectangular panels are coupled to one another at the long edges of the rectangular panels and are movable between a planar configuration and a stacked configuration. In the planar configuration, the rectangular panels may be positioned in a single plane and overlap an area corresponding to an open cargo volume of the vehicle. In the stacked configuration, the rectangular panels may be stacked together in parallel planes. In some embodiments, the guides travel in a track of the vehicle when the rectangular panels are moved between the planar configuration and the stacked configuration.

19 Claims, 7 Drawing Sheets

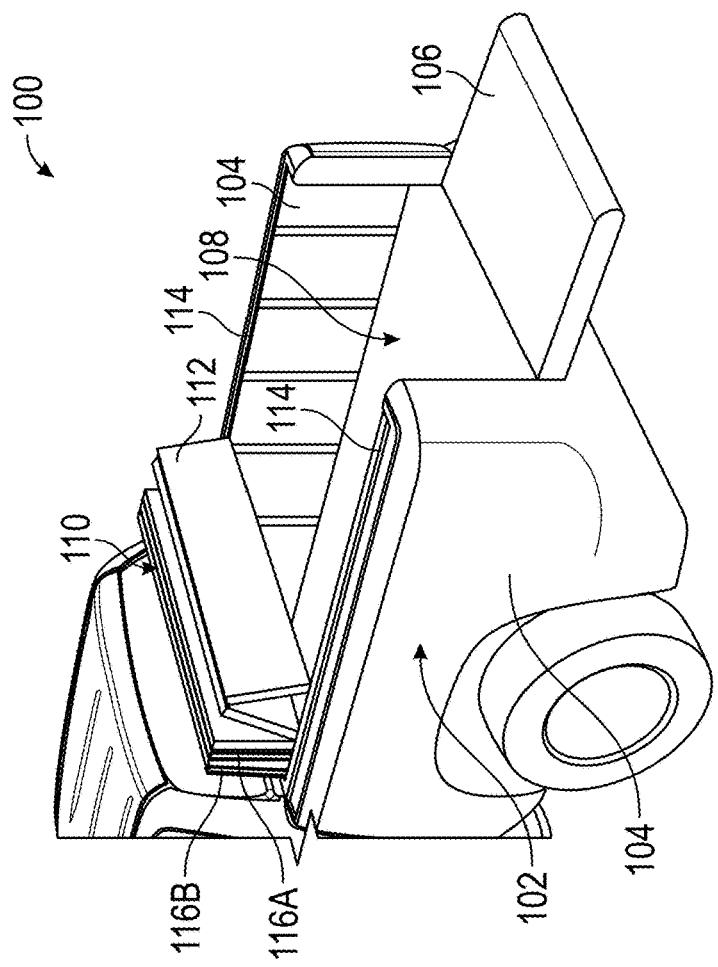
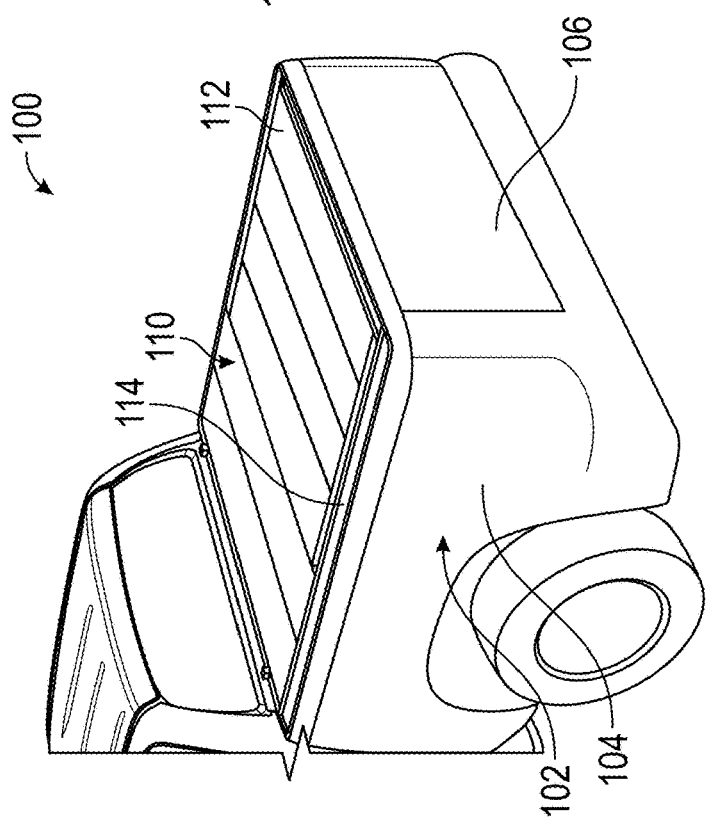

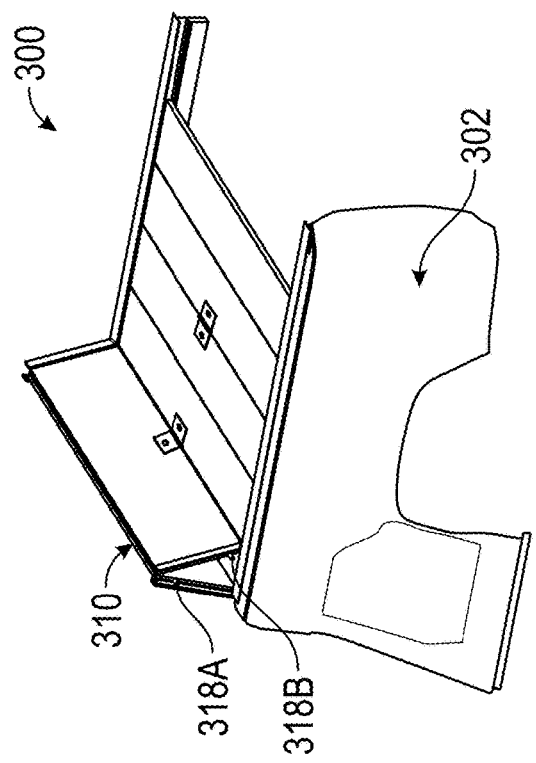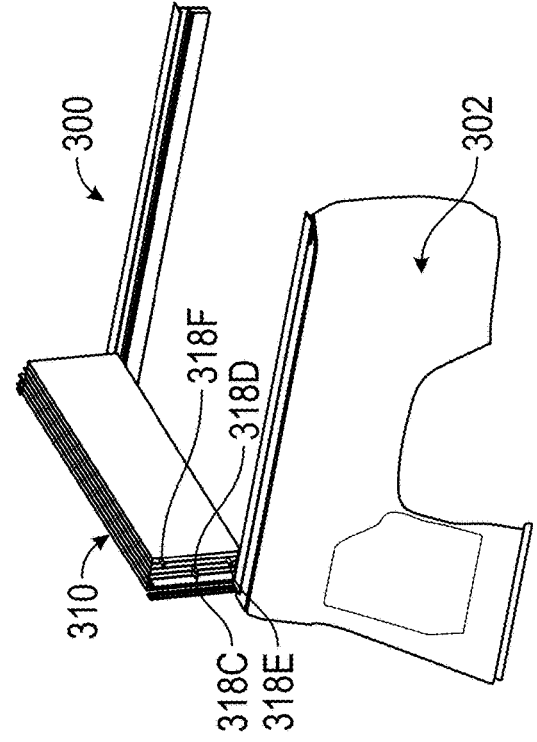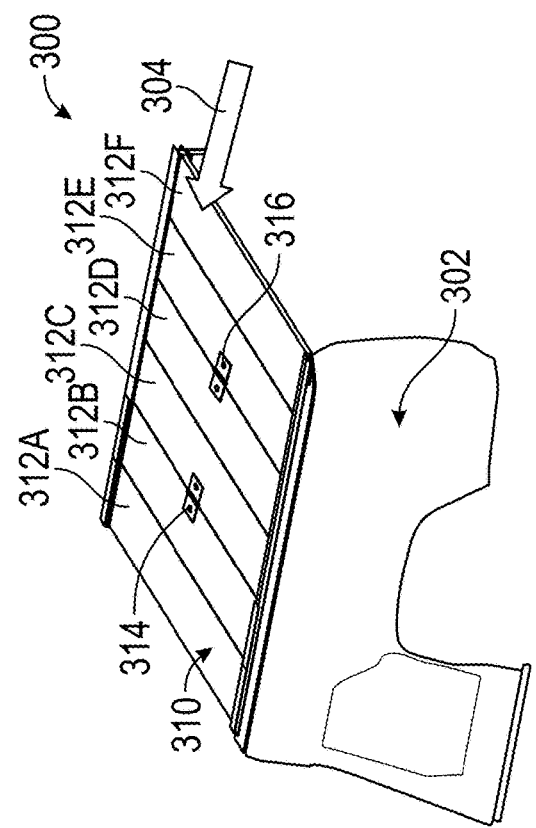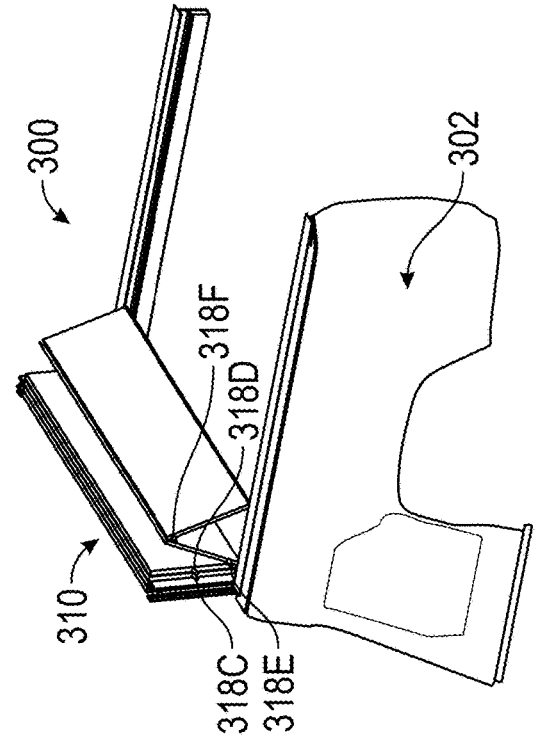

FOLDING TONNEAU COVER

INTRODUCTION

Tonneau covers are frequently used to protect cargo in truck beds. In some instances, tonneau systems include a removable cover that provides more options for transporting cargo. Removable tonneau covers sometimes include rectangular panels that extend in a plane to protect cargo and stack together when the tonneau cover is not in use.

BRIEF SUMMARY

Traditionally, tonneau covers stack into a truck bed. Disclosed herein are tonneau covers that stack above a truck bed. Advantageously, such covers can increase storage area within the truck bed and reduce ingress of debris that can accompany tonneau covers that stack inside a truck bed.

An embodiment of a cover for a vehicle includes rectangular panels. Each panel can include a long edge, a short edge, and a guide. In some embodiments, the rectangular panels are coupled to one another at the long edges of the rectangular panels and are movable between a planar configuration and a stacked configuration. In the planar configuration, the rectangular panels may be positioned in a single plane and overlap an area corresponding to an open cargo volume of the vehicle. In the stacked configuration, the rectangular panels may be stacked together in parallel planes. In some embodiments, the guides travel in a track of the vehicle when the rectangular panels are moved between the planar configuration and the stacked configuration.

In some embodiments, hinges may rotatably couple the rectangular panels. The hinges, in some embodiments, couple to the panels at the long edges of the rectangular panels. The hinges may alternately couple to upper and lower sides of the panels.

Some embodiments of the cover include springs configured to assist the rectangular panels to move from the planar configuration to the stacked configuration. In some embodiments of the cover, two panels at an end of the planar configuration are wider than other panels of the rectangular panels.

The guides may be staggered on the short edges of the rectangular panels. In the stacked configuration, some embodiments of the cover are configured to be rotated about a long edge of one of the panels. In the stacked configuration, some embodiments of the cover are configured to be removed from the track. In some embodiments of the cover, in the stacked configuration, the rectangular panels are configured to collectively rotate about a long edge of one of the panels.

In some embodiments, the rectangular panels include a sealing element configured to seal a joint between two rectangular panels at respective long edges.

An embodiment of a tonneau system for a vehicle includes rectangular panels and tracks. A panel of the rectangular panels may include a long edge, a short edge, and a guide, with the guides staggered on the short edges of the rectangular panels. The panels are, in some embodiments, movable between a planar configuration and a stacked configuration. In the planar configuration, the rectangular panels may be positioned in a single plane and overlap an area corresponding to an open cargo volume of the vehicle. In the stacked configuration, the rectangular panels may be stacked together in parallel planes. The guides, in some embodiments, travel in the tracks when the rectangular panels move between the planar configuration and the stacked configuration.

In some embodiments of the tonneau system, the stacked configuration includes the rectangular panels configured to collectively rotate about a long edge of one of the panels. The tonneau system, in some embodiments, including a latch at an end of the panels in the planar configuration, the latch securing the rectangular panels in the planar configuration. In some embodiments, the tracks include openings at an end, the openings positioned to correspond with different positions of the guides when the rectangular panels move between the planar configuration and the stacked configuration.

In some embodiments, the tonneau system includes a motor to move the panels between the planar configuration and the stacked configuration.

Embodiments of a vehicle include a cargo volume bounded by a bed and side walls, tracks mounted to the side walls and above the bed, and rectangular panels rotatably coupled to each other and collectively coupled to the tracks so that the panels can move between a planar configuration and a stacked configuration. In some embodiments, the rectangular panels are positioned above the track opposite from the bed when the panels are in the stacked configuration.

Some embodiments of the vehicle include guides attached to the rectangular panels and configured to interact with the tracks. In the stacked configuration of some embodiments, the rectangular panels collectively rotate about a long edge of one of the panels. In the stacked configuration of some embodiments, the rectangular panels are configured to be removed from the track.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

FIGS. 1A and 1B illustrate a vehicle with an example tonneau cover.

FIGS. 3A-3D illustrate a tonneau system in various configurations.

DETAILED DESCRIPTION

Figure 2:
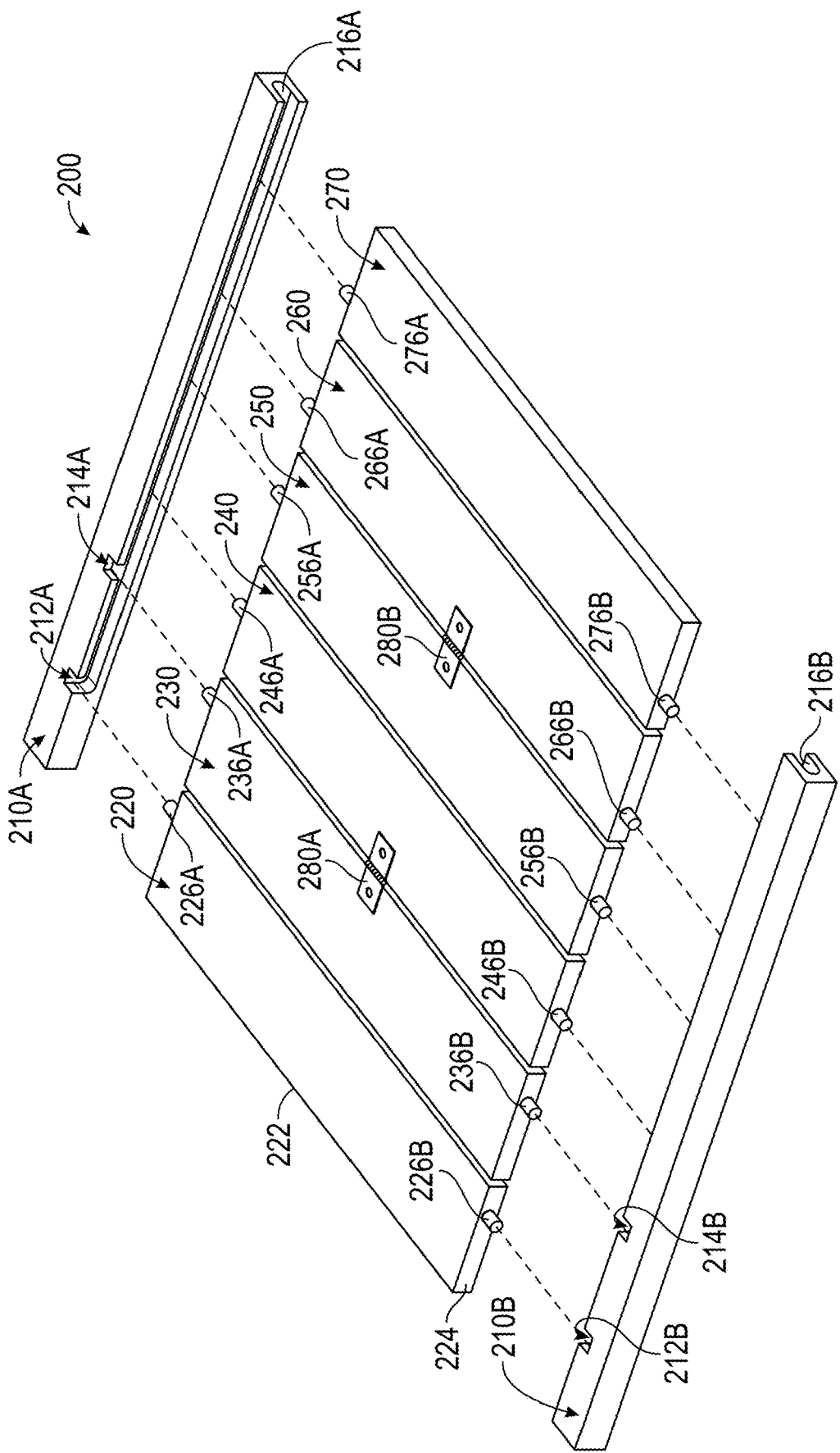
FIG. 2 illustrates an example tonneau system for a vehicle.

FIGS. 1A and 1B illustrate vehicle 100 with example tonneau cover 110. FIG. 1A depicts tonneau cover 110 in a planar configuration; FIG. 1B depicts tonneau cover 110 moving accordion-like from the planar configuration (overlapping cargo volume 108) to a stacked configuration (exposing cargo volume 108). In the stacked configuration, tonneau cover 110 is positioned above vehicle 100's truck bed 102. In this way, tonneau cover 110 advantageously stacks outside the truck bed 102, which provides more storage area within cargo volume 108 for adding items. Further, by folding above the truck bed 102, tonneau cover 110 may limit ingress of debris (dirt, rain, snow, etc.) to truck bed 102 that can accompany tonneau covers that fold inside a truck bed.

Vehicle 100 comprises an open cargo volume 108. In the examples of FIGS. 1A and 1B, cargo volume 108 is a truck bed 102 with side walls 104 and tail-gate 106 bounding cargo volume 108. Although the discussion herein primarily uses trucks and truck beds to illustrate embodiments, it should be appreciated that other vehicle types and cargo volumes will benefit from the systems disclosed herein. As used herein, a cargo volume can be understood to a include a volume of the vehicle configured to store cargo. An open cargo volume can be understood as a cargo volume that is not bounded on all sides. For example, truck 100 in FIG. 1B includes truck bed 108, which is a volume of vehicle 100 that stores cargo but is not bounded on top, leaving an open side.

Cover 110 includes multiple rectangular panels 112. In some embodiments, the rectangular panels are approximately 0.5-0.75 inches thick. Length and width of panels may vary based on the size of the truck bed. The panels are, in some embodiments, manufactured from a durable plastic, aluminum, and/or steel. The rectangular panels are collectively movable between a planar configuration and a stacked configuration. In the planar configuration, the rectangular panels are positioned in a single plane. Long edges of the rectangular panels are, in this configuration, adjacent one another so that the cover lies flat. As used herein, a single plane can be understood to include angular variations between the rectangular panels; in other words, a cover need not be perfectly flat in the planar configuration.

In the planar configuration illustrated in FIG. 1A, the rectangular panels 112 overlap an area corresponding to open cargo volume 108 of vehicle 100. As used herein, a cover overlaps an area corresponding to an open cargo volume when the cover occupies an area that would occlude an open portion of the cargo volume. In some embodiments, the panels, in the planar configuration, occlude the area. In other embodiments, the panels combined with tracks, extensions, or other components occlude the area.

In some embodiments, two of the rectangular panels are wider than other panels in a direction of the panels' long edge. As illustrated in FIGS. 1A and 1B, the two panels closest the cab are wider than the other rectangular panels. As used herein, a first panel is wider than a second panel when the first panel extends further than the second panel in a direction of their long edges. In some embodiments, the first panel is manufactured as one integral piece that is wider than the second panel. In other embodiments, two panels are manufactured with the same width, then one panel is fitted with an extension to increase the panel's dimension in a direction of its longer edge. FIGS. 1A and 1B illustrates extensions 116A and 116B on the first two panels closest to the cab.

In the stacked configuration, the rectangular panels are grouped together in parallel planes. In this configuration, the larger faces of the panels are adjacent. The panels need not be perfectly parallel for the cover to be in the "stacked configuration;" angular deviations from parallel is within the scope of this disclosure. As shown in FIGS. 3A-3D below, the rectangular panels, in the stacked configuration, occlude a smaller area than in the planar configuration. occluding the smaller area allows access to an open cargo volume, such as cargo volume 108 of vehicle 100. In the stacked configuration, cover 110 can be stowed in the vehicle or even removed from the vehicle, as described below with respect to FIGS. 4 and 5.

In some embodiments, the movement of the rectangular panels is assisted by guides (described below with respect to FIG. 2). The guides may travel in tracks, such as tracks 114 illustrated in FIGS. 1A and 1B. The guides and tracks may cooperate to control the movement of the rectangular panels between the planar configuration and the stacked configuration. Tracks can be mounted near the open portion of a cargo area to facilitate a cover overlapping the open portion of the cargo vehicle. For example, tracks 114 in FIGS. 1A and 1B are mounted to the top of truck bed side walls 104 so that rectangular panels 112 occlude cargo area 108 in the planer configuration (see FIG. 1A).

FIG. 2. illustrates an example tonneau system 200 for a vehicle. Tonneau system 200 includes tracks 210A and 210B and rectangular panels 220, 230, 240, 250, 260, and 270. In some embodiments, tonneau system 200 is tonneau system 110 described above with respect to FIGS. 1A and 1B. In FIG. 2, tracks 210A and 210B are spaced from the panels 220-270 for illustrative purposes. In use, pins 226A, 236A, 246A, 256A, 266A, and 276A are positioned in channel 216A and pins 226B, 236B, 246B, 256B, 266B, and 276B, are positioned in channel 216A, as indicated by the dotted lines.

Each of rectangular panels 220-270 comprises long edges, short edges, and guides. For illustration, panel 220 is numbered with long edge 222, short edge 224, and guides 226A and 226B. The guides of rectangular panels 220-270 move within channels 216A and 216B of tracks 210A and 210B when the cover is moved between the planar configuration and the stacked configuration. When the cover is not moving, the guides interact with the track to hold the panels in place. Guides can be understood to be any feature that constrains a panel in position or to move in a certain orientation when the guide interacts with an associated track. This interaction may hold the panels in position to occlude the open cargo volume and/or move the panels in a desired direction when the tonneau system is moved between the planar configuration and the stacked configuration. In the embodiment of system 200, guides 226A and 226B are pins which travel in channels 216A and 216B of tracks 210A and 210B, respectively. In other embodiments, guides include wheels, magnetic couplings, ball bearings, etc. with corresponding tracks.

FIGS. 3A-3D illustrate a portion of a vehicle 300 with a tonneau system 310 installed on a truck bed 302. Tonneau system 310 includes rectangular panels 312A-312F (with correspond guides 318A-318F), and hinges 314 and 316 rotatably coupling pairs of panels. In some embodiments, tonneau system 310 is tonneau system 110 and/or tonneau system 200.

FIG. 3A illustrate the tonneau system in a planar configuration. A force 304 (e.g., a manual force, a motor driven force) is applied to panel 312 which causes panels 312A and 312B to fold upward, as shown in FIG. 3B. While panels 312A and 312B fold upward, the remaining panels 312C-312F move in a plane. Guides 312C-F (visible in FIGS. 3B and 3D) may move within the tracks of tonneau system 310 so that panels 312C-312F stay in the plane. As panels 312C and 312D approach the stacked position, those panels also fold upward (when guides 312C and 312D leave the track) while panels 312E and 312F move in the plane (while guides 312E and 312F move within the track). Then, panels 312E and 312F fold upward, as shown in FIG. 3C. If the force is continued, then all panels are moved to the stacked configuration, as shown in FIG. 3D. It will be appreciated that force 304 is exemplary and forces could be applied on different portions of the tonneau system 310 and in different directions.

Returning to FIG. 2, each of tracks 210A and 210B include openings-track 210A includes openings 212A and 214A and track 210B includes openings 212B and 214B. Opening 212A permits guide 226A to leave channel 216A of track 210A (similarly, opening 212B permits guide 226B to leave channel 216B of track 210B). In this way, panel 220 is free to rotate upward in response to a force (e.g., force 304) applied to the rectangular panels. In some embodiments, additional openings correspond to positions of guides of other panels. In FIG. 2, for example, opening 214A of track 210A and opening 214B of track 210B permit guides 236A and 236B to leave channels 216A and 216B, respectively. Because panels 220 and 230 fold together as one pair, guides of both panels are permitted to leave their respective channels simultaneously. In some embodiments, only one pair of openings (e.g., openings 212A and 212B) is used because only one panel (in this example, panel 220) is fitted with guides. The end of the channel 216A (and 216B) may be curved toward opening 212A (and 212B) to assist the rectangular panels leave the channel when stacking. As the panels 220-270 move from the planar configuration to the stacked configuration, guides of other panels approach and move through openings 212A, 212B, 214A, and 214B.

As illustrated in FIGS. 3A-3D, while two panels are folding, some other panels may move in a plane associated with the track. For example, panels 220 and 230 may fold while panels 240-270 are moving in a plane (as illustrated by the panels in FIGS. 3A-3D). When panel 240 arrives at the opening and the associated guides are ready to leave the track, panels 220 and 230 have already folded above the track and occupy a volume above the track. When panels 240 and 250 fold, they must occupy a different volume than stacked panels 220 and 230. To achieve stacking of panels in different volumes, some embodiments include guides positioned at different points on the respective panels. This staggering of the guide's positions allows the same track openings to be used for stacking all panels. As shown in FIG. 2, 226B and 236B are positioned to the right of center on the short edges of panels 220 and 230, 246B and 256B are positioned at the center on the short edges of panels 240 and 250, and 266B and 276B are positioned to the left of center on the short edges of panels 260 and 270 (226A, 236A, 246A, 256A, 266A, and 276A are similarly positioned at different points on their respective short edges). It will be appreciated that the exact position of the guides on the panels can be varied provided that the guides correspond to the track openings when leaving the track.

In some embodiments, the rectangular panels are rotatably coupled to one another at their long edges. As illustrated in the embodiment of FIG. 2, hinges 280A and 280B couple panel pairs 230-240 and 250-260, respectively. Positioning of hinge 280A (and hinge 280B) on the long edges of panel pairs 230-240 (and pairs 250-260) will bias those panel pairs to fold in a desired direction (in the example image of FIG. 2, the pairs fold so that they point out of the page). Additional hinges (not shown) may couple to the other side of the rectangular panels (e.g., coupling panel 220 to panel 230, panel 240 to panel 250, and panel 260 to panel 270) and will bias those panel pairs to fold in a different direction (in the example image of FIG. 2, the pairs fold so that they point into the page). Thus, the hinges alternately couple to upper and lower sides of the panels so that panel pairs fold in alternating directions.

In some embodiments, springs assist the rectangular panels to move from the planar configuration to the stacked configuration. For example, a spring can bias pairs of panels to fold in a certain direction. This biasing may assist with countering the pull of gravity that may oppose stacking the panels above the track. In some embodiments, the springs are loaded hinges that provide a restoring force. As used herein, springs may include any feature that provides a bias in a desired direction. For example, springs include magnetic poles that attract or repel so that a force is provided to favor movement in a desired direction.

As described above, some embodiments include rectangular panels that are wider than others. Exemplary wider panels (with extensions 116A and 116B) are illustrated in FIGS. 1A and 1B (for ease of illustrating openings 212A, 212B, 214A, and 214B, wider panels are not depicted in FIG. 2). Advantageously, these wider panels may cover openings 212A, 212B, 214A, and 214B when the cover is the planar configuration. This may advantageously reduce foreign material (debris, dirt, rain, etc.) from entering through the openings and damaging the track and/or guides. In some embodiments, only panels aligned with track openings, when the panels are in the planar configuration, need be wider. In FIG. 2, only panels 220 and 230 correspond to openings and, thus, only these panels need be wider than the others in the planar configuration. Some embodiments, for example, may include only one opening at the end of each track (and consequently include a guide only on every other rectangular panel); in such embodiments, only the panel closest to the end of the track need be wider than other panels.

In some embodiments, the rectangular panels include a sealing element configured to seal a joint between two rectangular panels at respective long edges.

Some embodiments include a motor (not shown) to move the panels between the planar configuration and the stacked configuration. The motor may be operatively coupled to at least one panel to provide a force that moves the panels between configurations. As used herein, a motor is operatively coupled to the panels when the motor provides a direct or indirect force that causes the rectangular panels to move between the planar configuration to the stacked configuration. Examples of operative couple include, but are not limited to, a motor connected to a system that provides a pulling or pushing force on a panel or panels, a motor that pushes or pulls the guides (e.g., a belt system, a cord tied to the guides), and a motor that moves the tracks. In some embodiments, a user-interface can provide control over movement of the tonneau system between the planar and stacked configurations.

In some embodiments, the tonneau system includes a latch that secures the rectangular panels in the planar configuration. For example, a latch on panel 270 interacts with a tail gate or a truck bed side-wall to secure the rectangular panels in the planar configuration. In some embodiments, the tonneau system is configured to first require opening of the tail gate (and thereby release of the latch) to permit movement of the panels from the planar configuration to the stacked configuration. In this way, the tonneau system may be locked in the planar configuration until the tail gate is opened and the latch is released.

In some embodiments, a panel at one end is rotatably coupled to a vehicle or to a track. Referring to FIG. 2, panel 220 may be connected by a hinge (not shown) along long edge 222 to a vehicle. In some embodiments, the connection is directly to the vehicle and, in other embodiments, the connection is indirectly to the vehicle (e.g., a beam extend from track 210A to track 210B along long edge 222). The rotatable coupling may include (in addition or in the alternative to a hinge) additional pins on the short edges of panel 220 that cooperate with track 210A and 210B. This rotational coupling may advantageously allow for panel 220 to move into the correct position above the tracks when the tonneau system is moved from the planar configuration to the stacked configuration.

Figure 4B:
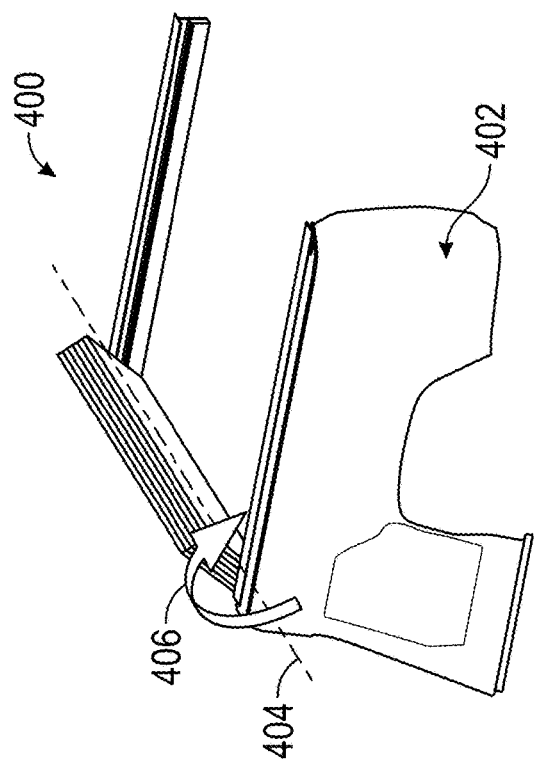
FIGS. 4A-4D illustrate a tonneau system in various configurations.
Figure 4D:
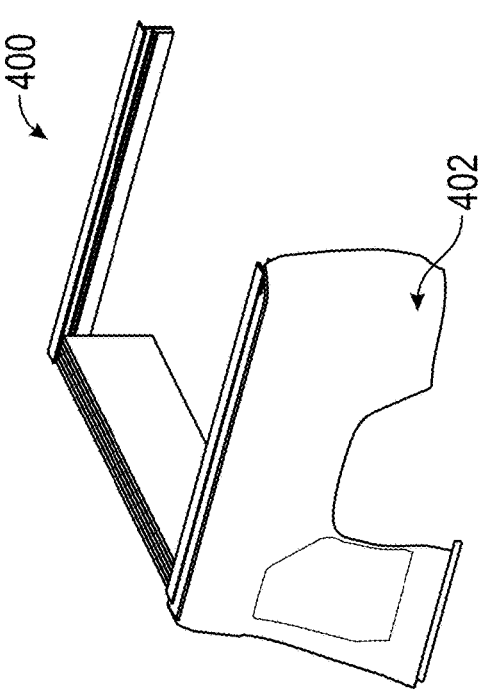
Figure 4A:
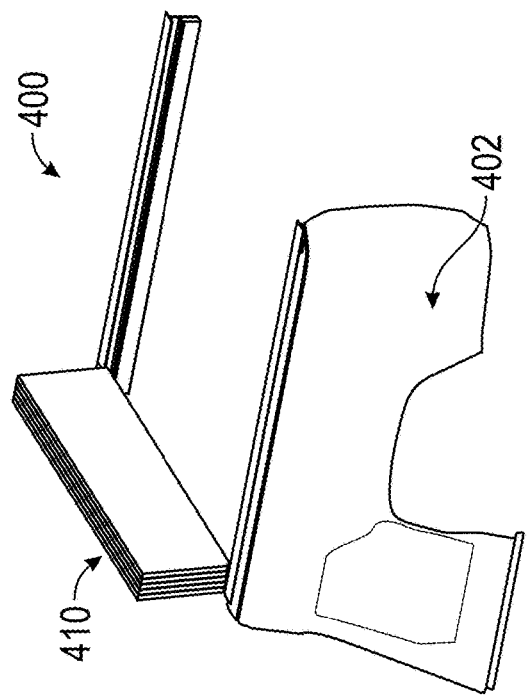
Figure 4C:
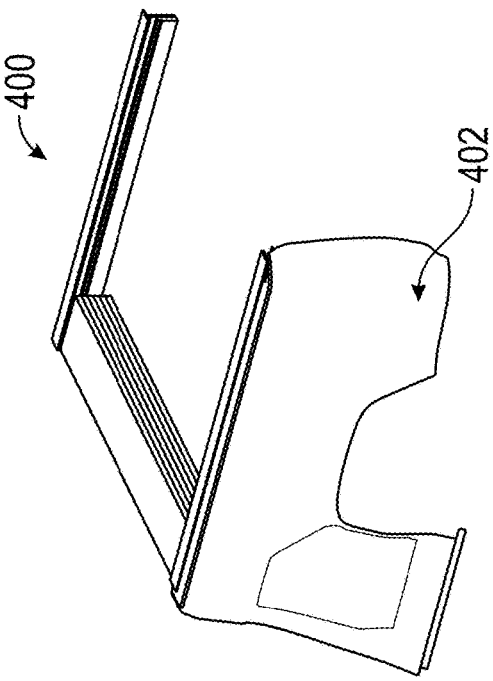

FIGS. 4A-4D illustrate tonneau system 410 mounted on vehicle truck bed 402. In some embodiments, tonneau system 410 is tonneau system 110, tonneau system 200, and/or tonneau system 310. As illustrated in FIGS. 4A-4D, the rectangular panels of tonneau system 410 can be moved from the stacked configuration to lie in line with a plane of the top of truck bed 402 and/or turned down into truck bed 402. Advantageously, moving the rectangular panels into these positions may reduce wind resistance, improve visibility through a rear window of a vehicle, or improve aesthetics. FIG. 4A may correspond to FIG. 3D described above. From this configuration, the rectangular panels are rotated about axis 404 along the long edge of a panel in direction 406, as shown in FIG. 4B. Continuing with this movement, FIG. 4C depicts the panels lying in line with a top of the truck bed. As shown in FIG. 4D, further rotation in the direction of 406 can turn the panels down into truck bed 402.

Figure 5A:
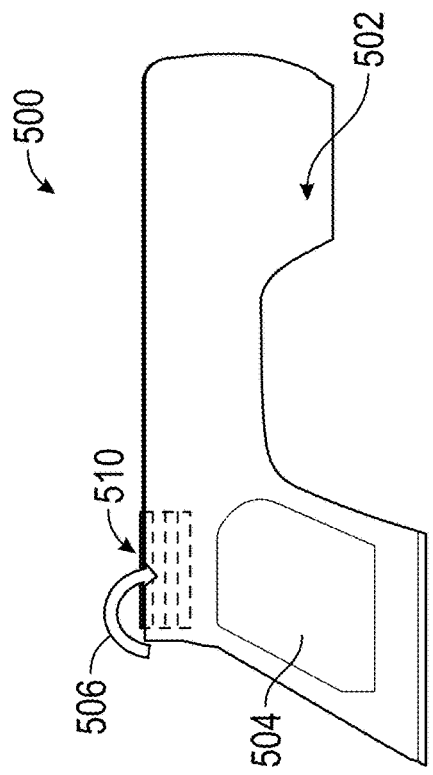
FIGS. 5A-5D illustrate a tonneau system in various configurations.
Figure 5B:
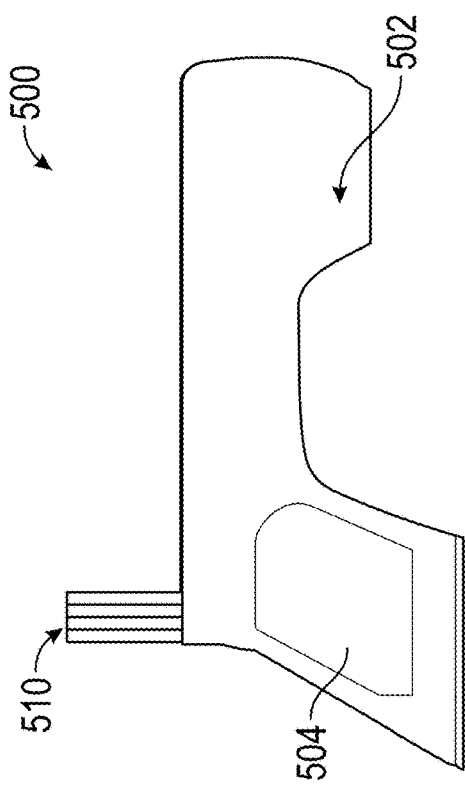
Figure 5C:
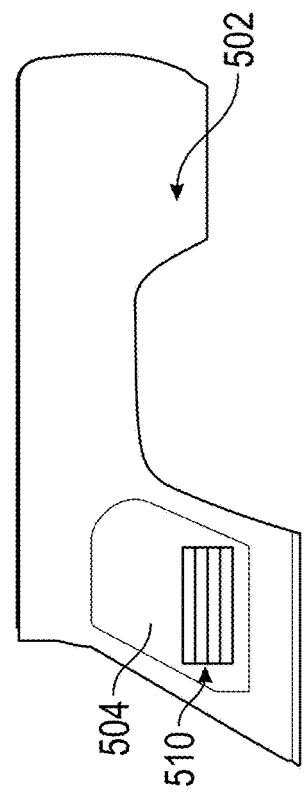
Figure 5D:
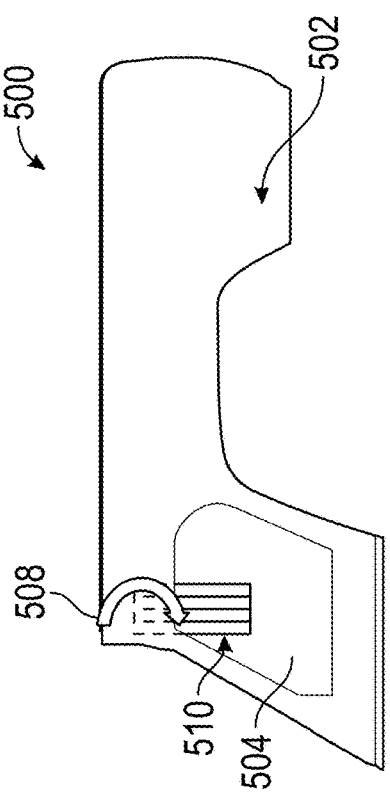

FIGS. 5A-5D illustrate tonneau system 510 mounted on vehicle truck bed 502. In some embodiments, tonneau system 510 is tonneau system 110, tonneau system 200, tonneau system 310, and/or tonneau system 410. As illustrated in FIGS. 5A-5D, the rectangular panels of tonneau system 510 can be moved from the stacked configuration (FIG. 510) to lie in line with a plane of the top of truck bed 502 (FIG. 5B) and/or turned down into truck bed 402 (FIG. 5C). FIGS. 5A, 5B, and 5C may correspond to side views of the positions of tonneau system 410 illustrated in FIGS. 4A, 4C, and 4D respectively. As with tonneau system 410, the rectangular panels are rotated in a direction (506). FIG. 5D further illustrates the rectangular panels in a position to be removed from the track of tonneau system 510. Some embodiment may include an access port (e.g., port 504) in the truck bed so that the rectangular panels can be removed completely from the truck.

Figure 6:
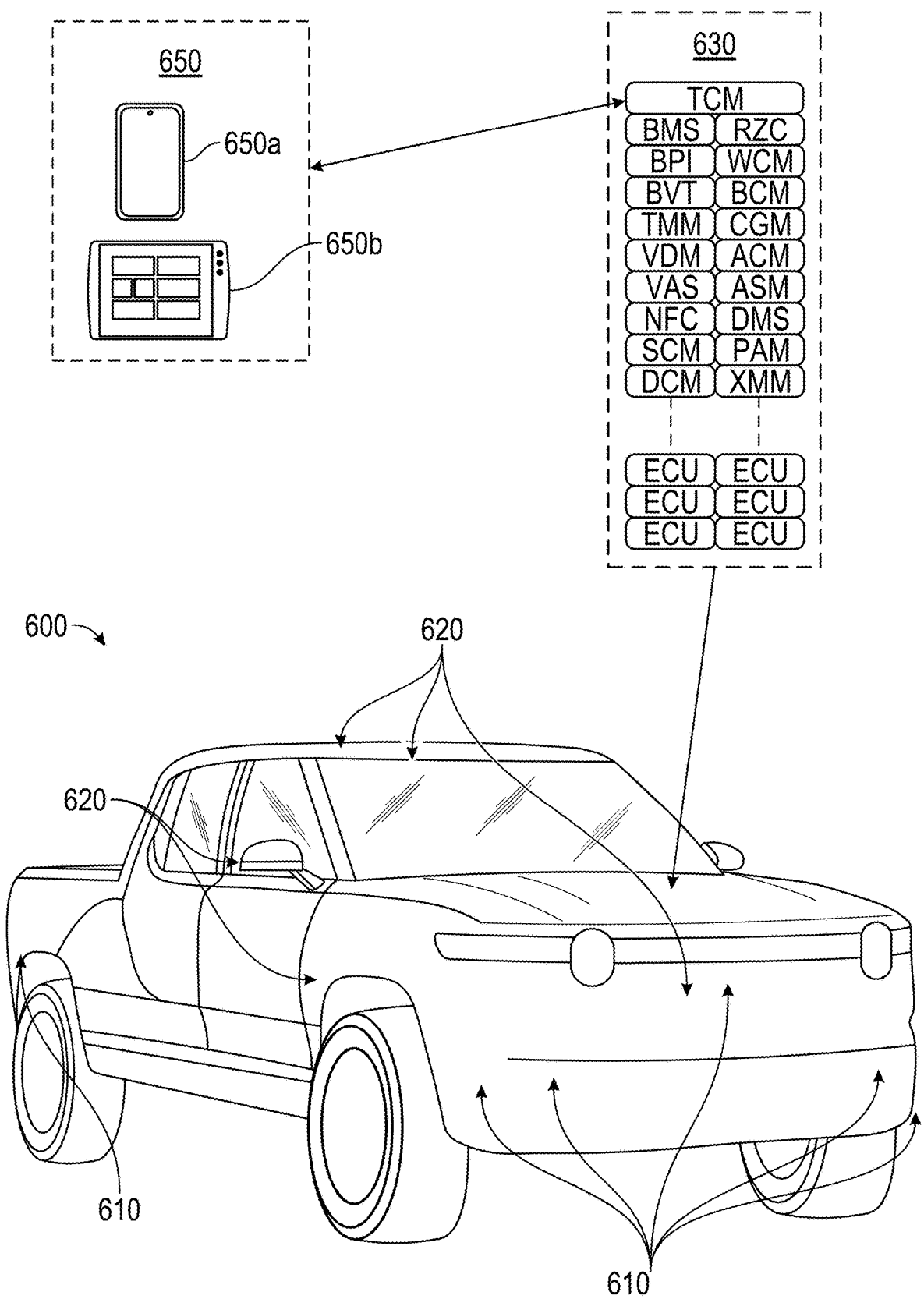
FIG. 6 illustrates an example vehicle.

FIG. 6 illustrates an example vehicle 600. Vehicle 600 may include multiple sensors 610, multiple cameras 620, and a control system 630. In some embodiments, vehicle 600 may be able to pair with a computing device 650 (e.g., smartphone 650a, tablet computing device 650b, or a smart vehicle accessory). As an example and not by way of limitation, a sensor 610 may be an accelerometer, a gyroscope, a magnetometer, a global positioning satellite (GPS) signal sensor, a vibration sensor (e.g., piezoelectric accelerometer), a light detection and ranging (LiDAR) sensor, a radio detection and ranging (RADAR) sensor, an ultrasonic sensor, a temperature sensor, a pressure sensor, a humidity sensor, a chemical sensor, an electromagnetic proximity sensor, an electric current sensor, another suitable sensor, or a combination thereof. As an example and not by way of limitation, a camera 620 may be a still image camera, a video camera, a 3D scanning system (e.g., based on modulated light, laser triangulation, laser pulse, structured light, light detection and ranging (LiDAR)), an infrared camera, another suitable camera, or a combination thereof. Vehicle 600 may include various controllable components (e.g., doors, seats, windows, lights, HVAC, entertainment system, security system), instrument and information displays and/or interactive interfaces, functionality to pair a computing device 650 with the vehicle (which may enable control of certain vehicle functions using the computing device 650), and functionality to pair accessories with the vehicle, which may then be controllable through an interactive interface in the vehicle or through a paired computing device 650.

Control system 630 may enables control of various systems on-board the vehicle. As shown in FIG. 6, control system 630 may comprise one or more electronic control units (ECUs), each of which are dedicated to a specific set of functions. Each ECU may be a computer system (as described further in FIG. 7), and each ECU may include functionality provide by one or more of the example ECUs described below.

Features of embodiments as described herein may be controlled by one or more ECUs that provide functionality to control access to the vehicle. A Vehicle Access System (VAS) ECU may provide passive/active wireless sensors (e.g., Bluetooth) authorizing accessing (i.e., locking or unlocking) the vehicle. A Near-Field Communication (NFC) ECU may support an NFC reader embedded in the vehicle (e.g., in the driver-side exterior door handle or in the armrest of the interior, driver-side door panel) for user authentication.

Features of embodiments as described herein may be controlled by a Telematics Control Module (TCM) ECU. The TCM ECU may provide a wireless vehicle communication gateway to support functionality such as, by way of example and not limitation, over-the-air (OTA) software updates, communication between the vehicle and the internet, communication between the vehicle and a computing device 650, in-vehicle navigation, vehicle-to-vehicle communication, communication between the vehicle and landscape features (e.g., automated toll road sensors, automated toll gates, power dispensers at charging stations), or automated calling functionality.

Features of embodiments as described herein may be controlled by a Rear Zone Control (RZC) ECU. The RZC ECU may provide functionality to control different body components, such as, by way of example and not limitation, a license plate lamp, based on vehicle body type. For vehicles with a truck bed, the RZC ECU may provide functionality to control a tonneau cover, sidebin latch, tailgate latch, sidebin lights, or cargo lamps. For a sport utility-type vehicle with a rear door, the RZC ECU may provide functionality to control liftgate latches, a liftgate actuator, puddle lamps, or a rear wiper. For vehicles with a tow hitch, the RZC ECU may provide functionality to control trailer braking or a trailer brake stop light. For vehicles with a third row of seats, the RZC ECU may provide functionality to control movement of interior components to facilitate easy entry to the rear seats. For a delivery vehicle, the RZC ECU may provide functionality to control movement of a bulkhead door motor and latches, rollup door latches, various lamps, rear stop lights, and turn lights.

Features of embodiments as described herein may be controlled by a Body Control Module (BCM) ECU. The BCM ECU may provide electronic controls for various components of the body of the vehicle, such as, by way of example and not limitation: interior lighting (e.g., cabin lights, seatbelt lights), exterior lighting (e.g., headlamps, side lights, rear lights, camp lights), power outlets, frunk switch, window wiper movement and washer fluid deployment, the overhead center console, horn, power ports, and wireless accessory charging and docking.

Features of embodiments as described herein may be controlled by a Central Gateway Module (CGM) ECU. The CGM ECU may serve as the vehicle's communications hub that connects and transfer data to and from the various ECUs, sensors, cameras, motors, and other vehicle components. The CGM ECU may include a network switch that provides connectivity through Controller Area Network (CAN) ports, Local Interconnect Network (LIN) ports, and Ethernet ports. The CGM ECU may also serve as the master control over the different vehicle modes (e.g., road driving mode, parked mode, off-roading mode, tow mode, camping mode), and thereby control certain vehicle components related to placing the vehicle in one of the vehicle modes. In some embodiments, for electric vehicles, the CGM ECU may also control the vehicle charge port door and related light(s) and sensor(s).

Features of embodiments as described herein may be controlled by an Experience Management Module (XMM) ECU may generate a user interface displayed on a dashboard of the vehicle. The user interface may display information and provide audio output for an infotainment system, including various views around and inside the vehicle. XMM may provide interactive controls for a number of different vehicle functions that may be controlled in conjunction with enabling the designated mode, such as, by way of example and not limitation: controlling interior and exterior lighting, vehicle displays (e.g., instrument cluster, center information display, and rear console display), audio output (e.g., audio processing, echo cancellation, beam focusing), music playback, heating, ventilation, and air conditioning (HVAC) controls, power settings, Wi-Fi connectivity, Bluetooth device connectivity, and vehicle leveling, as well as displaying information in the user interface (e.g., surround view camera feed, distance to nearest charger, and minimum range). In some embodiments, interactive controls provided by XMM may enable interaction with other modules of control system 630.

Vehicle 600 may include one or more additional ECUs, such as, by way of example and not limitation: a Vehicle Dynamics Module (VDM) ECU, a Seat Control Module (SCM) ECU, a Door Control Module (DCM) ECU, an Autonomy Control Module (ACM) ECU, an Autonomous Safety Module (ASM) ECU, a Driver Monitoring System (DMS) ECU, and/or a Winch Control Module (WCM) ECU. If vehicle 600 is an electric vehicle, one or more ECUs may provide functionality related to the battery pack of the vehicle, such as a Battery Management System (BMS) ECU, a Battery Power Isolation (BPI) ECU, a Balancing Voltage Temperature (BVT) ECU, and/or a Thermal Management Module (TMM) ECU.

Figures 7A, 7B:
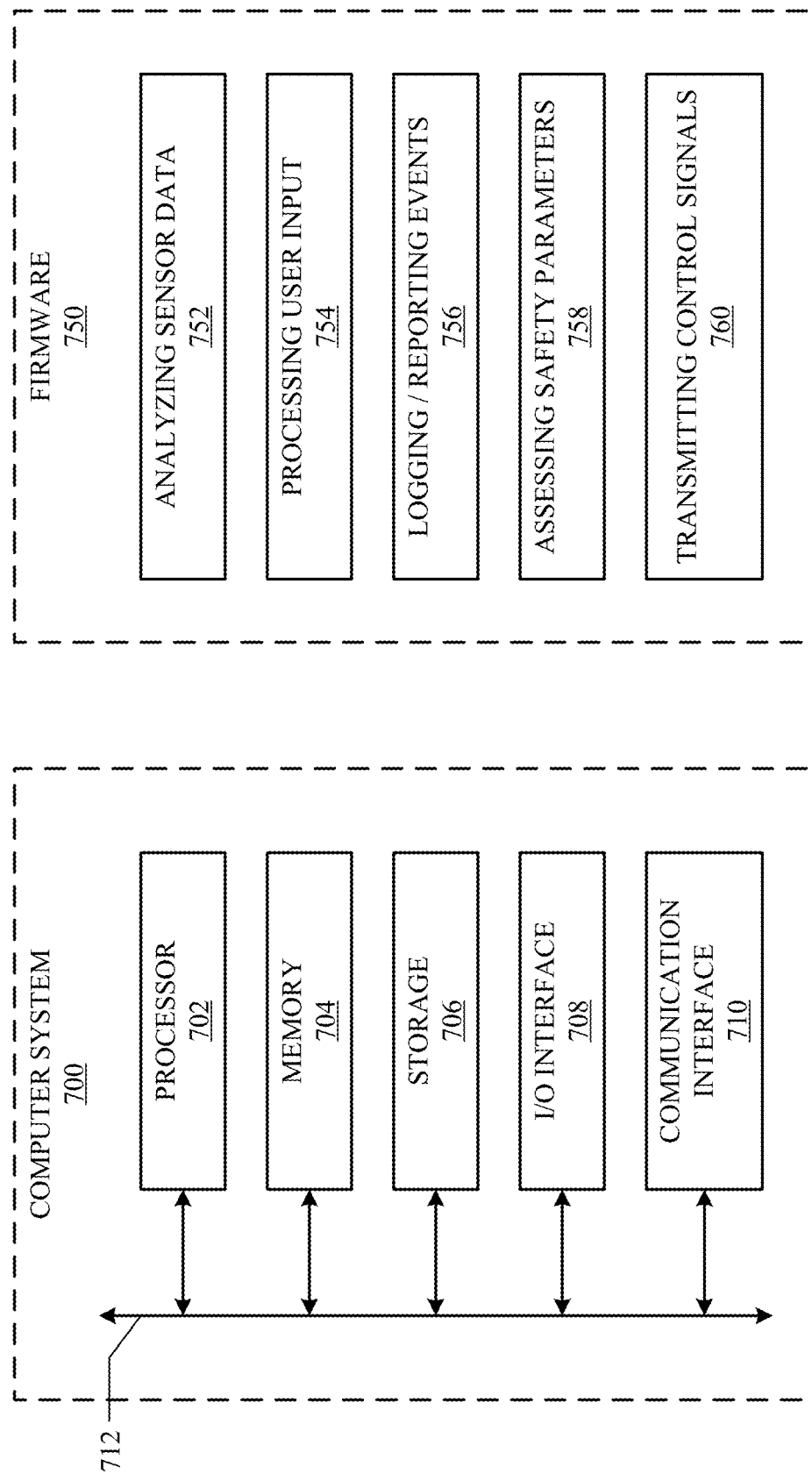
FIG. 7A is a schematic of an example computer system.
FIG. 7B illustrates example firmware for a vehicle ECU.

FIG. 7A illustrates an example computer system 700. Computer system 700 may include a processor 702, memory 704, storage 706, an input/output (I/O) interface 708, a communication interface 710, and a bus 712. Although this disclosure describes one example computer system including specified components in a particular arrangement, this disclosure contemplates any suitable computer system with any suitable number of any suitable components in any suitable arrangement. As an example and not by way of limitation, computer system 700 may be an electronic control unit (ECU), an embedded computer system, a system-on-chip, a single-board computer system, a desktop computer system, a laptop or notebook computer system, a mainframe, a mesh of computer systems, a mobile telephone, a personal digital assistant, a server computing system, a tablet computer system, or a combination of two or more of these. Where appropriate, computer system 700 may include one or more computer systems 700; be unitary or distributed, span multiple locations, machines, or data centers; or reside in a cloud, which may include one or more cloud components in one or more networks. Where appropriate, computer system(s) 700 may perform, at different times or at different locations, in real time or in batch mode, one or more steps of one or more methods described or illustrated herein.

Processor 702 may include hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. Processor 702 may include one or more internal caches for data, instructions, or addresses.

In particular embodiments, memory 704 includes main memory for storing instructions for processor 702 to execute or data for processor 702 to operate on. In particular embodiments, one or more memory management units (MMUs) reside between processor 702 and memory 704 and facilitate accesses to memory 704 requested by processor 702. In particular embodiments, memory 704 includes random access memory (RAM). This disclosure contemplates any suitable RAM.

In particular embodiments, storage 706 includes mass storage for data or instructions. As an example and not by way of limitation, storage 706 may include a removable disk drive, flash memory, an optical disc, a magneto-optical disc, magnetic tape, or a Universal Serial Bus (USB) drive or two or more of these. Storage 706 may include removable or fixed media and may be internal or external to computer system 700. Storage 706 may include any suitable form of non-volatile, solid-state memory or read-only memory (ROM).

In particular embodiments, I/O interface 708 includes hardware, software, or both, providing one or more interfaces for communication between computer system 700 and one or more input and/or output (I/O) devices. Computer system 700 may be communicably connected to one or more of these I/O devices, which may be incorporated into, plugged into, paired with, or otherwise communicably connected to vehicle 600 (e.g., through the TCM ECU). An input device may include any suitable device for converting volitional user input into digital signals that can be processed by computer system 700, such as, by way of example and not limitation, a steering wheel, a touch screen, a microphone, a joystick, a scroll wheel, a button, a toggle, a switch, a dial, or a pedal. An input device may include one or more sensors for capturing different types of information, such as, by way of example and not limitation, sensors 610 described above. An output device may include devices designed to receive digital signals from computer system 700 and convert them to an output format, such as, by way of example and not limitation, speakers, headphones, a display screen, a heads-up display, a lamp, a smart vehicle accessory, another suitable output device, or a combination thereof. This disclosure contemplates any suitable I/O devices and any suitable I/O interfaces 708 for them. I/O interface 708 may include one or more I/O interfaces 708, where appropriate.

In particular embodiments, communication interface 710 includes hardware, software, or both providing one or more interfaces for data communication between computer system 700 and one or more other computer systems 700 or one or more networks. Communication interface 710 may include one or more interfaces to a controller area network (CAN) or to a local interconnect network (LIN). Communication interface 710 may include one or more of a serial peripheral interface (SPI) or an isolated serial peripheral interface (isoSPI). In some embodiments, communication interface 710 may include a network interface controller (NIC) or network adapter for communicating with an Ethernet or other wire-based network or a wireless NIC (WNIC) or wireless adapter for communicating with a wireless network, such as a WI-FI network or a cellular network.

In particular embodiments, bus 712 includes hardware, software, or both coupling components of computer system 700 to each other. Bus 712 may include any suitable bus, as well as one or more buses 712, where appropriate. Although this disclosure describes a particular bus, any suitable bus or interconnect is contemplated.

FIG. 7B illustrates example firmware 750 for a vehicle ECU 700 as described with respect to control system 630. Firmware 750 may include functions 752 for analyzing sensor data based on signals received from sensors 610 or cameras 620 received through communication interface 710. Firmware 750 may include functions 754 for processing user input (e.g., directly provided by a driver of or passenger in vehicle 600, or provided through a computing device 650) received through I/O interface 708. Firmware 750 may include functions 756 for logging detected events (which may be stored in storage 706 or uploaded to the cloud), as well as functions for reporting detected events (e.g., to a driver or passenger of the vehicle through an instrument display or interactive interface of the vehicle, or to a vehicle manufacturer, service provider, or third party through communication interface 710). Firmware 750 may include functions 758 for assessing safety parameters (e.g., monitoring the temperature of a vehicle battery or the distance between vehicle 600 and nearby vehicles). Firmware 750 may include functions 760 for transmitting control signals to components of vehicle 600, including other vehicle ECUs 700.

Herein, a computer-readable non-transitory storage medium or media may include one or more semiconductor-based or other integrated circuits (ICs) (such, as for example, field-programmable gate arrays or application-specific ICs), hard disk drives, hybrid hard drives, optical discs, optical disc drives, magneto-optical discs, magneto-optical drives, solid-state drives, RAM drives, any other suitable computer-readable non-transitory storage media, or any suitable combination. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context. It should also be understood that as used in the description herein and throughout the claims that follow, the meaning of "a," "an," and "the" includes "one" and "more than one" unless the context clearly dictates otherwise.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:

1. A cover for a vehicle, comprising:
   rectangular panels, each panel comprising a long edge, a short edge, and a guide, wherein;
      the rectangular panels are coupled to one another at the long edges of the rectangular panels and are movable between a planar configuration and a stacked configuration;
      in the planar configuration, the rectangular panels are positioned in a single plane and overlap an area corresponding to an open cargo volume of the vehicle;
      in the stacked configuration, the rectangular panels are stacked together in parallel planes;
      the guides travel in a track of the vehicle when the rectangular panels are moved between the planar configuration and the stacked configuration; and
      two panels at an end of the planar configuration are wider in a direction of the long edge than other panels of the rectangular panels.

2. The cover of claim 1, wherein in the stacked configuration, the rectangular panels are configured to collectively rotate about a long edge of one of the panels.

3. The cover of claim 2, further comprising hinges rotatably coupling the rectangular panels.

4. The cover of claim 3, wherein the hinges couple to the panels at the long edges of the rectangular panels.

5. The cover of claim 3, wherein the hinges alternately couple to upper and lower sides of the panels.

6. The cover of claim 1, further comprising springs configured to assist the rectangular panels to move from the planar configuration to the stacked configuration.

7. The cover of claim 1, the guides are staggered on the short edges of the rectangular panels.

8. The cover of claim 1, wherein, in the stacked configuration, the cover is configured to be rotated about a long edge of one of the panels.

9. The cover of claim 1, wherein, in the stacked configuration, the cover is configured to be removed from the track.

10. The cover of claim 1, wherein the rectangular panels further comprise a sealing element configured to seal a joint between two rectangular panels at respective long edges.

11. A tonneau system for a vehicle, comprising:
rectangular panels, each panel comprising a long edge, a short edge, and a guide, wherein:
the guides are staggered on the short edges of the rectangular panels and are movable between a planar configuration and a stacked configuration;
in the planar configuration, the rectangular panels are positioned in a single plane and overlap an area corresponding to an open cargo volume of the vehicle;
in the stacked configuration, the rectangular panels are stacked together in parallel planes; and
two panels at an end of the planar configuration are wider in a direction of the long edge than other panels of the rectangular panels; and
tracks in which the guides travel when the rectangular panels move between the planar configuration and the stacked configuration.

12. The tonneau system of claim 11, wherein, in the stacked configuration, the rectangular panels are configured to collectively rotate about a long edge of one of the panels.

13. The tonneau system of claim 11, further comprising a latch at an end of the panels in the planar configuration, wherein the latch secures the rectangular panels in the planar configuration.

14. The tonneau system of claim 11, wherein the tracks comprise openings at an end, the openings positioned to correspond with different positions of the guides when the rectangular panels move between the planar configuration and the stacked configuration.

15. The tonneau system of claim 11, further comprising a motor to move the panels between the planar configuration and the stacked configuration.

16. A vehicle comprising:
a cargo volume bounded by a bed and side walls;
tracks mounted to the side walls and above the bed; and
rectangular panels rotatably coupled to each other and collectively coupled to the tracks so that the panels can move between a planar configuration and a stacked configuration, wherein;
in the stacked configuration, the rectangular panels are positioned above the track opposite from the bed; and
two panels at an end of the planar configuration are wider in a direction of the long edge than other panels of the rectangular panels.

17. The vehicle of claim 16, further comprising guides attached to the rectangular panels and configured to interact with the tracks.

18. The vehicle of claim 16, wherein, in the stacked configuration, the rectangular panels are configured to collectively rotate about a long edge of one of the panels.

19. The vehicle of claim 16, wherein, in the stacked configuration, the rectangular panels are configured to be removed from the track.

* * * * *